Aug. 30, 1932.  W. E. DUNNING  1,874,938
INDICATOR FOR CASH REGISTERS
Filed May 2, 1929   3 Sheets-Sheet 1

Inventor
William E. Dunning
By Harry Frease Attorney

Aug. 30, 1932.   W. E. DUNNING   1,874,938
INDICATOR FOR CASH REGISTERS
Filed May 2, 1929   3 Sheets-Sheet 3

Inventor
William E. Dunning
By Harry Frease Attorney

Patented Aug. 30, 1932

1,874,938

UNITED STATES PATENT OFFICE

WILLIAM E. DUNNING, OF ALLIANCE, OHIO, ASSIGNOR TO THE McCASKEY REGISTER COMPANY, OF ALLIANCE, OHIO, A CORPORATION OF OHIO

INDICATOR FOR CASH REGISTERS

Application filed May 2, 1929. Serial No. 359,845.

The invention relates to indicating devices for cash registers adapted to display the amount of a sale or transaction and more particularly to such a device which first gives a temporary indication when the keys of the cash register are operated and then gives a relatively permanent indication at another point when the operating handle is pulled.

In the use of cash registers, it frequently happens that the operator of the machine will accidentally depress the wrong key, thus indicating and registering the wrong amount for a sale or transaction. As the indication is not made until the transaction is completed on the machine, it will be seen that in case of an error there is no way for the operator to correct his mistake before "ringing up" the transaction.

The object of the improvement is to provide an indicator which will display both to the operator of the cash register and to the customer a temporary indication as soon as the operator depresses the keys of the cash register, this temporary indication remaining visible until the operating handle is pulled by the operator, at which time the temporary indication disappears and a permanent indication is displayed at another point, remaining visible until the next transaction upon the machine.

With this improved construction, in the event the operator erroneously sets up the wrong amount in the register, the same will be immediately indicated upon the temporary indicator to both the operator and the customer before the operating handle is pulled and the operator may then correct the setting of the apparatus before pulling the operating handle, thus providing against ringing up a wrong transaction on the machine.

Figure 1:
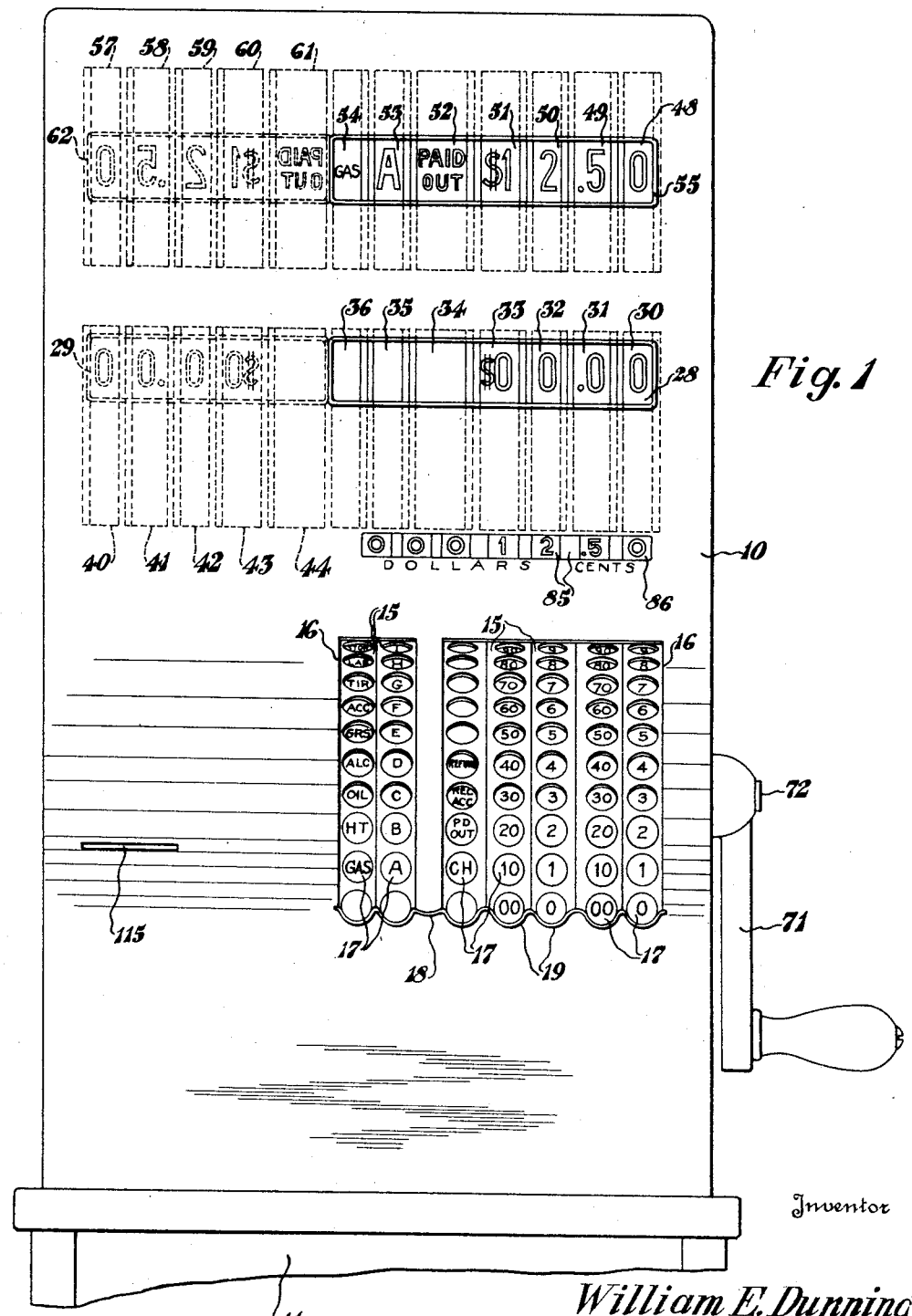
Figure 2:
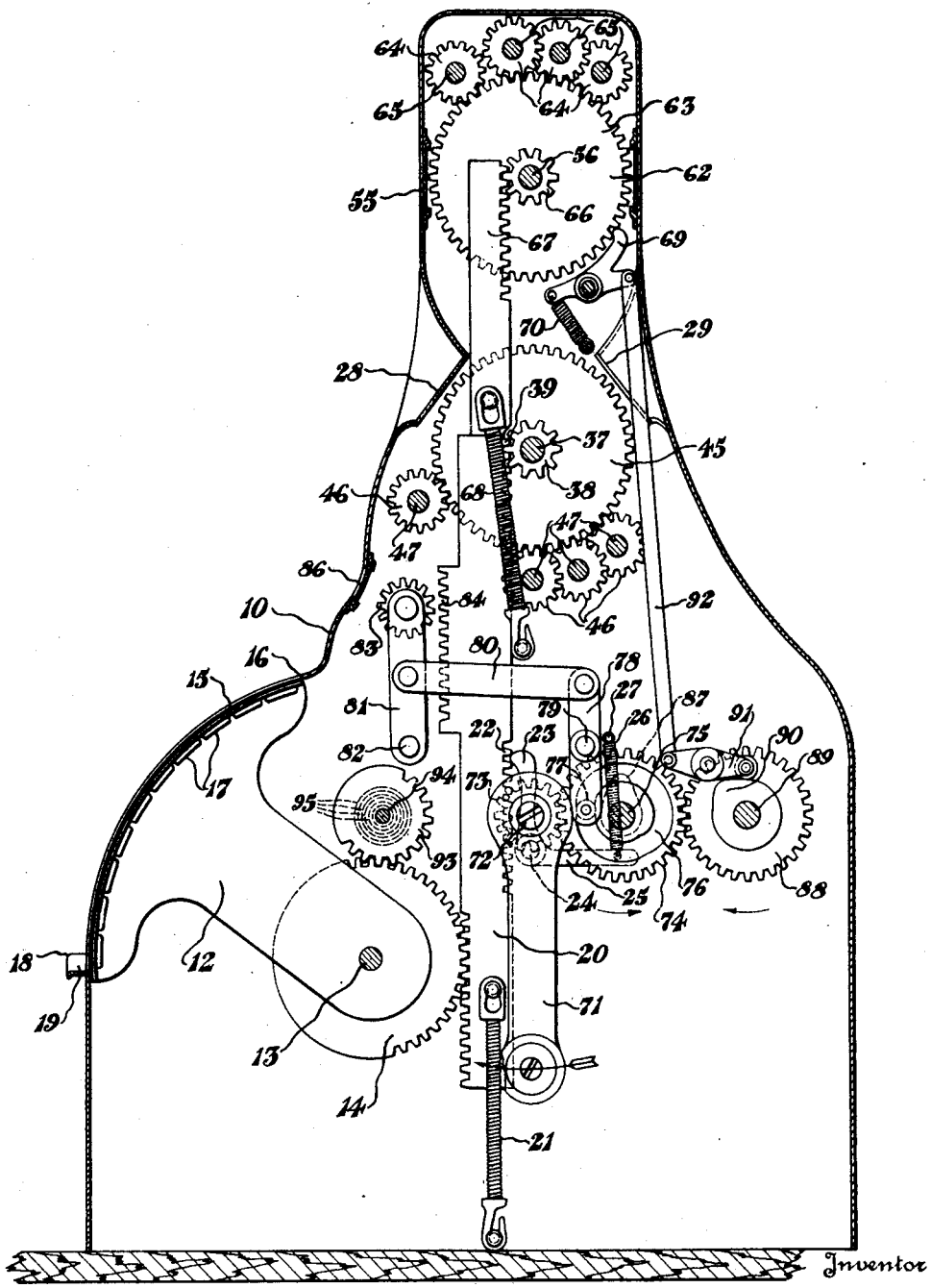
Figure 4:
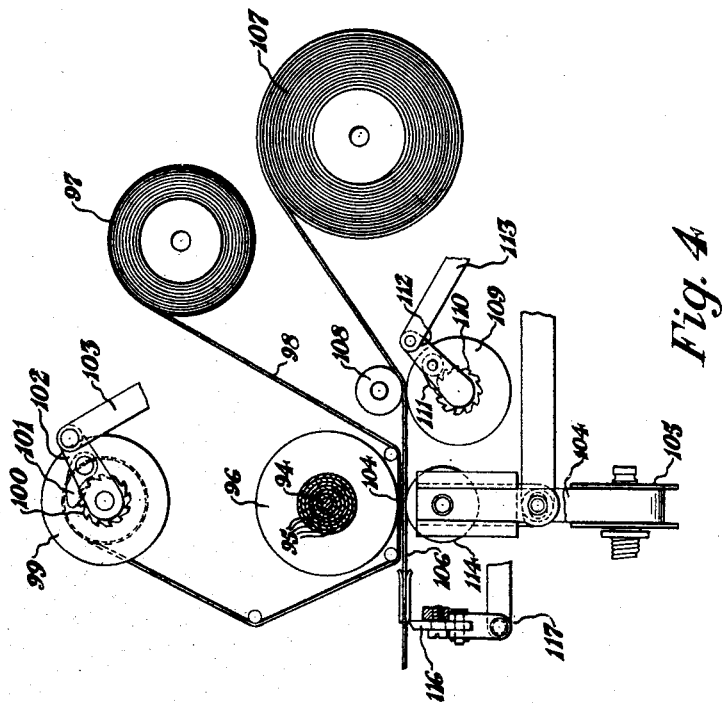
Figure 3:
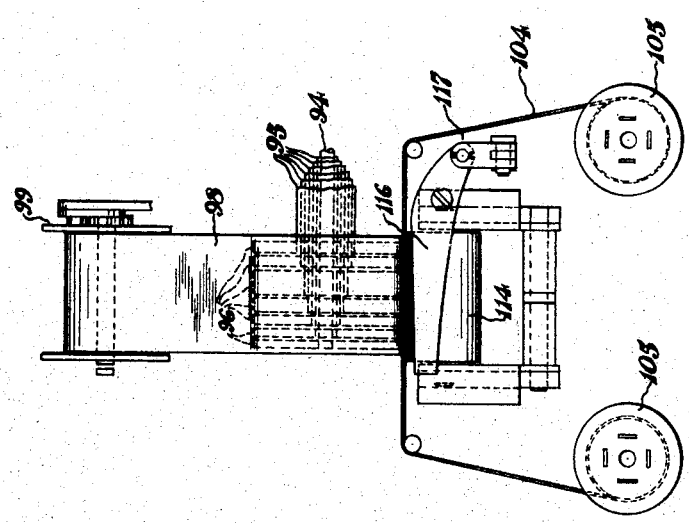

An embodiment of the invention is illustrated in the accompanying drawings, in which Figure 1 is a front elevation of a cash register provided with the improved indicating mechanism;

Fig. 2, a transverse vertical section through the cash register;

Fig. 3, a detail elevation of the printing or recording mechanism associated with the improved indicating mechanism; and Fig. 4, a side elevation, partly in section, of said printing mechanism.

Similar numerals refer to similar parts throughout the drawings.

The cash register is enclosed within a housing 10 and mounted upon the usual cash drawer 11 and any usual and well known adding mechanism may be provided for totaling up the transactions upon the machine during a day or other given period.

Any suitable or desirable key mechanism may be employed for setting up the amounts of various transactions or sales in the machine, a preferred mechanism being illustrated in the drawings and comprising a plurality of segments 12 journaled upon a shaft 13 and each having fixed thereto a gear 14.

Each of these segments has an arcuate flanged portion 15 displayed through an opening 16, in the front of the housing, and provided with a plurality of sockets 17 into which the operator may insert a finger tip for setting up the amount of a sale or transaction in the machine.

A flange 18, provided with depressions 19, conforming to the positions of the several segments, may be fixed upon the front of the housing at the lower edge of the openings 16.

Each of the gears 14 meshes with a substantially vertical rack bar 20, a spring 21 being connected to the lower portion of each rack bar and to the bottom portion of the housing for normally holding the rack bars in lowered position, as indicated in Fig. 2.

Ratchet teeth 22 are provided upon each rack bar and adapted to be engaged by a pawl 23 for holding the rack bars in adjusted position against the pull of the springs 21. Each pawl is pivoted as upon a shaft 24 mounted within the housing and is provided with an angular arm 25 to which is connected a pull spring 26 attached as at 27 to some stationary portion of the mechanism, within the housing.

The temporary or initial indicating mechanism is operated by the rack bars 20 and comprises means for initially or temporarily indicating to the operator through a window 28 in the front side of the housing and mechanism for simultaneously indicating the same amount to the purchaser through a window 29 in the rear side of the housing.

The mechanism for indicating to the operator comprises a plurality of rotatable cylinders, one cylinder being adapted to be operated by each type bar. These cylinders are indicated at 30, 31, 32, 33, 34, 35 and 36 and may be rotatably mounted upon a shaft 37 fixed within the housing, each cylinder having fixed thereon a pinion 38 meshing with the teeth 39 formed at the upper portion of the corresponding rack bar.

Each of these cylinders has figures or other information provided around its periphery, one row of these figures or the like being adapted to be exposed through the opening 28 so as to indicate to the operator the amount and nature of the item.

For the purpose of also having an initial or temporary indication to the customer of the amount set up in the machine, a second series of cylinders may be mounted in alinement with the cylinders above described and preferably rotatable upon the shaft 37.

This second series of cylinders is shown at 40, 41, 42, 43 and 44 and each cylinder of this set is co-ordinated in movement with the corresponding cylinder of the first named set in the manner disclosed in my copending application Serial No. 332,149, filed January 12, 1929.

For this purpose a gear 45 may be fixed upon each cylinder for engagement with one of the pinions 46 mounted upon the shafts 47 whereby corresponding cylinders in each set may be co-ordinated in movement, the cylinders 40 to 44 inclusive being provided with figures and other information corresponding to the cylinders 30 to 34 inclusive respectively, and adapted to display one row at a time of said figures through the window 29, in the manner illustrated and described in my copending application above referred to.

Thus it will be seen that as each of the cylinders 30 to 34 inclusive is rotated, the corresponding cylinders 40 to 44 will be rotated a similar distance, so that the same item will appear simultaneously to the operator and customer through the sight openings 28 and 29 respectively, giving them both an indication of the amount which has been set up in the machine before the operating handle is pulled to ring up the amount.

For the purpose of giving a substantially permanent indication to the operator and customer, mechanism similar to that above described is located in the upper portion of the housing and comprises a series of cylinders 48, 49, 50, 51, 52, 53 and 54, corresponding to the cylinders 30 to 36 inclusive and adapted to indicate to the operator through a window 55 in the front of the housing.

These cylinders are all independently rotatably mounted upon a shaft 56 mounted within the housing and for the purpose of giving a substantially permanent indication to the customer, a second series of cylinders 57, 58, 59, 60 and 61, corresponding to the cylinders 48, 49, 50, 51 and 52, respectively, is mounted in alinement with said last named cylinders, preferably being independently rotatably mounted upon the shaft 56.

These cylinders are adapted to indicate the item rung up to the customer through a window 62 in the rear side of the housing.

Each of the cylinders 48 to 52 and 57 to 61 inclusive has fixed thereon a gear 63 and these cylinders are co-ordinated, as above described, by means of the pinions 64 mounted upon shafts 65.

Each of the cylinders 48 to 54 inclusive has fixed thereon a pinion 66 meshing with a rack bar 67 slidably mounted in any suitable manner above the corresponding rack bar 20 and adapted to be normally urged toward the same as by a spring 68.

A pawl 69 is adapted to normally engage each of the gears 63, being urged toward the same as by the spring 70 arranged to normally hold the cylinders against rotation.

The operating handle 71 is fixed upon a shaft 72 journaled through the side of the housing and having a pinion 73 fixed thereon. This pinion meshes with a gear 74 mounted upon the shaft 75 and having a cam groove 76 formed in one face.

A pin or roller 77 carried by a lever 78 rides in the cam groove, the lever being pivoted intermediate its ends as at 79 to any stationary portion of the mechanism and having its opposite end connected to one end of a link 80, the other end of which is connected intermediate the ends of a lever 81 pivoted as at 82 within the machine.

The lever 81 carries the adding mechanism operated by pinions 83 adapted to mesh with the teeth 84 upon the rack bars 20 and having cylinders or the like of usual construction, as shown at 85 for displaying the total through a window 86 in the front of the housing.

This adding mechanism and total indicator may be of any usual and well known construction and since the construction thereof forms no part of the invention, the same is not illustrated in detail.

A cam 87 is carried by the shaft 75 and adapted to engage the arm 25 of the pawl 23 to withdraw said pawl from contact with the ratchet teeth 22 at the proper time. A gear 88 mounted upon a shaft 89, meshes with the gear 74. A cam 90 is fixed upon the shaft 89 and operates the lever 91 which is connected by a link 92 with the pawl 69 for the purpose of withdrawing said pawl from engagement with the gear 63.

It is customary to provide cash registers with a printing mechanism which prints each item upon a roll or strip of paper within the machine, in order to keep a permanent record of all transactions and at the same time, a ticket is printed for each transaction and discharged from the machine to be given to the customer.

This printing mechanism is operated by a series of pinions 93 meshing with the gears 14, one of said pinions being mounted upon a shaft 94 and the remaining pinions being mounted upon tubular shafts 95 surrounding one another and the shaft 94.

A plurality of printing rolls 96 is provided for printing the paper strip and tickets, one of these rolls being fixed upon each of the shafts 94 and 95. The paper strip upon which the permanent record is kept is fed from a stock roll 97 and passed downward as at 98 and beneath the printing rolls and then upward around a spool 99 provided with a ratchet 100 arranged to be operated by a pawl 101 carried by the lever 102 which is connected as by the link 103 with suitable operating mechanism (not shown) co-ordinated with the movement of the operating handle 71.

A typewriter ribbon 104 is arranged to pass beneath the paper strip 98 directly below the printing rolls, being carried from one ribbon spool 105 to another in usual manner. The ticket strip 106 is fed from a stock roll 107 by means of the feed rolls 108 and 109, the roll 109 having the ratchet 110 driven by a pawl 111 upon a lever 112 which is operated through a link 113 co-ordinated with the operating handle.

This ticket strip is carried beneath the typewriter ribbon 104, being held tightly against the same as by the roll 114 and as each ticket is printed, it is passed outward through a slot 115 in the front of the housing, being cut off as by the knife 116 operated by any suitable lever mechanism, as indicated at 117 which is co-ordinated with the movement of the operating mechanism to cut the ticket as it is printed and fed forward.

In operating the cash register, the tip of the finger or a lead pencil or the like is inserted into the proper recess or socket 17 of each of the segments 12 and the segment is rocked downward upon its pivot until the finger contacts with the corresponding notch 19 in the flange 18.

As each segment is operated, the gear 14 carried thereby co-acting with the teeth at the lower end of the corresponding rack bar 20 will raise the rack bar, against the pull of the spring 21, the pawl 23 holding the rack bar in the raised position.

As each rack bar is raised, the teeth 39 thereon co-acting with the pinion 38 upon the corresponding cylinders 30 to 36 inclusive will rotate the cylinder, displaying through the window 28 the desired figure or character. Through the gears 45, pinions 46 and shafts 47, the cylinders 40 to 44 inclusive will be operated in unison with the cylinders 30 to 34 inclusive, displaying the same figures and characters to the customer through the window 29.

Thus both the operator and customer can see at a glance the amount set up in the machine before the operating lever is pulled to ring up the item and in the event the operator has made a mistake in setting up the item, the same can be corrected by changing the positions of the segments 12.

After the item is properly set up in the machine, the operating handle 71 is turned in the direction of the arrow shown in Fig. 2 in order to ring up the amount and to record and register the same. Through the pinion 73, the gears 74 and 88 will be rotated in the directions of the arrows shown on Fig. 2.

As the gears 74 and 68 are rotated, first the cams 90 will operate upon the levers 91 and through the links 92 the pawls 69 will be pulled out of engagement with the gears 63, permitting the springs 68 to pull the rack bars 67 down into contact with the upper ends of the rack bars 20, thus turning the cylinders 48 to 54 inclusive into positions corresponding with the cylinders 30 to 36 inclusive.

Through the pinions 64 and shafts 65, the cylinders 57 to 61 inclusive will be turned to positions corresponding with the cylinders 48 to 52 inclusive, thus indicating through the windows 55 and 62 to the operator and customer respectively, the amount of the item which has been rung up.

Upon further rotation of the gears 74 and 88 the cam groove 76 will operate the lever 78 through the link 80 and lever 81 to engage the pinions 83 of the adding mechanism with the teeth 84 of the rack bars 20, and then the cam 87 will engage the arm 25, releasing the pawl 23 from engagement with its corresponding rack bar 20.

As soon as these pawls are released, the springs 21 will pull all of the rack bars 20 down to the normal position. This movement of the rack bars will, through the teeth 84 and pinions 83, operate the adding mechanism while at the same time the gears 14 co-operating with the pinions 92 will operate the printing rolls.

The indications upon the cylinders at the top of the housing will remain displayed through the windows 55 and 62 until the next operation of the machine, while the indications through the windows 28 and 29 will only remain visible until the operation of the handle 71.

It should be understood that as soon as the gears 63 are moved to the proper position by the rack bars 67 being pulled into engagement with the rack bars 20, the pawl 69 is moved back into engagement with the gears, holding them in this position.

As the rack bars 20 reach the normal or lowered position, the lever 81 will be tilted back into the position shown in Fig. 2, moving the adding mechanism out of engagement with the teeth 84.

From the above it will be seen that the adding mechanism and printing mechanism, as in usual practice, are not operated until the operating handle 71 is pulled, while it is also obvious that the temporary indications will be displayed through the windows 28 and 29 to the operator and customer respectively, as soon as the amount is set up in the machine and before the operation of the handle 71.

This permits both the operator and customer to check each item as it is placed in the machine and permits correction of the same before the operating handle is pulled.

I claim:

1. A cash register including means for setting up items therein, rack bars operated by said means, temporary indicating means operated by said rack bars, relatively permanent indicating means, rack bars operatively connected to the permanent indicating means, means for moving the last named rack bars into contact with the first named rack bars, means for normally preventing the second named rack bars from being moved toward the first named rack bars, and means for operating the last named means to permit the second named rack bars to be moved toward the first named rack bars.

2. A cash register including means for setting up items therein, rack bars operated by said means, temporary indicating means operated by said rack bars, relatively permanent indicating means, rack bars operatively connected to the permanent indicating means, means for moving the last named rack bars into contact with the first named rack bars, means for normally preventing the second named rack bars from being moved toward the first named rack bars, means for operating the last named means to permit the second named rack bars to be moved toward the first named rack bars, and means for returning the first named rack bars and setting up means to normal position.

In testimony that I claim the above, I have hereunto subscribed my name.

WILLIAM E. DUNNING.